(12) United States Patent
Paavola

(10) Patent No.: US 10,458,585 B2
(45) Date of Patent: Oct. 29, 2019

(54) BLAST ACTIVATED QUICK-DISCONNECT APPARATUS

(71) Applicant: Dean Curtis Paavola, Maricopa, AZ (US)

(72) Inventor: Dean Curtis Paavola, Maricopa, AZ (US)

(73) Assignee: ROBERTSON FUEL SYSTEMS, L.L.C, Tempe, AZ (US)

( * ) Notice: Subject to any disclaimer, the term of this patent is extended or adjusted under 35 U.S.C. 154(b) by 435 days.

(21) Appl. No.: 14/661,017

(22) Filed: Mar. 18, 2015

(65) Prior Publication Data

US 2016/0273692 A1  Sep. 22, 2016

(51) Int. Cl.
*F16L 37/30* (2006.01)
*F16L 55/10* (2006.01)

(52) U.S. Cl.
CPC .......... *F16L 37/30* (2013.01); *F16L 55/1015* (2013.01); *F16L 2201/20* (2013.01); *Y10T 137/0391* (2015.04); *Y10T 137/87957* (2015.04)

(58) Field of Classification Search
CPC ... F16L 37/30; F16L 55/1015; F16L 2201/20; Y10T 137/0391; Y10T 137/87957
USPC ..... 285/1, 2, 81, 84, 85, 316; 137/13, 68.14, 137/614.04
See application file for complete search history.

(56) References Cited

U.S. PATENT DOCUMENTS

| | | | | |
|---|---|---|---|---|
| 2,803,473 A | * | 8/1957 | Hohmann | B64D 39/06 137/614.04 |
| 3,520,331 A | * | 7/1970 | Locke | F16L 37/23 285/1 |
| 4,776,614 A | * | 10/1988 | Marrison | F16L 37/23 285/316 |
| 4,898,199 A | * | 2/1990 | Morris | F16L 55/1015 285/2 |
| 5,310,226 A | * | 5/1994 | Norkey | F16L 37/22 285/316 |
| 5,896,889 A | * | 4/1999 | Menard | F16L 37/23 137/614.04 |

OTHER PUBLICATIONS

Eaton Aeroquip(R) 3900 Series Quick-Disconnect Couplings, Product Brochure, 8 Pages, Mar. 2013.

* cited by examiner

*Primary Examiner* — Greg Binda
(74) *Attorney, Agent, or Firm* — Smith Tempel; Steven P. Wigmore

(57) ABSTRACT

Blast activated quick-disconnect apparatus in cooperation with a quick disconnect device including a two-piece body with a longitudinally movable collar surrounding a portion of each of the two pieces, the collar holding the two pieces together in a first position and separating the two pieces in a second or activated position. The apparatus including mounting apparatus fixedly attaching the quick disconnect device to a vehicle to be protected from physical shock or concussion, a mass affixed to the movable collar of the two-piece body, a spring having one end abutting the mass, and a spring stop formed as one of a portion of the mounting apparatus or a separate component. The spring being designed to provide a bias on the mass that prevents movement of the mass and collar into the activated position during accelerations in a normal use range.

13 Claims, 4 Drawing Sheets

US 10,458,585 B2

BLAST ACTIVATED QUICK-DISCONNECT APPARATUS

FIELD OF THE INVENTION

This invention relates in general to apparatus for quickly disconnecting fuel lines and the like in the event of a physical shock or concussion.

BACKGROUND OF THE INVENTION

It is not uncommon for vehicles to encounter events in which a sudden shock or concussion (hereinafter "blast") is sufficient to rupture fuel lines, which in many instances causes as much damage (fire, etc.) as or more damage than the initial event. This is especially true in the military where vehicles (e.g. trucks, troop carriers, tanks, etc. and even various airplanes) may be continually subjected to various explosive devices, such as bombs, mines, IEDS and the like. As an example, the shock or concussion from a mine exploding below a vehicle will often drive the vehicle into the air, rupturing the fuel line or lines and resulting in a fire that may destroy the vehicle more completely than the original mine.

Quick disconnect devices are available commercially (see for example the off-the-shelf fuel quick disconnect by Eaton/Aeroquip) but are generally hand operated and will not automatically disconnect a fuel line. Some prior art disconnect devices have been proposed but are complicated, expensive and hard to install or use. One example of the prior art devices is disclosed in U.S. Pat. No. 3,719,194 which teaches a break-away coupling including two confronting bodies held together by a frangible sleeve and pins. Upon application of adequate separating forces between the bodies, the pins or sleeve fractures, the bodies separate, and the valve carried in each body is closed by a spring. For purposes of this disclosure the terms "blast" and "blast activated" are defined as adequate separating forces caused by any event.

It would be highly advantageous, therefore, to remedy the foregoing and other deficiencies inherent in the prior art.

Accordingly, it is an object of the present invention to provide new and improved blast activated quick-disconnect apparatus.

It is another object of the present invention to provide new and improved blast activated quick-disconnect apparatus that is relatively inexpensive and easy to install and use.

SUMMARY OF THE INVENTION

Briefly, the desired objects and aspects of the instant invention are realized in accordance with blast activated quick-disconnect apparatus in cooperation with a quick disconnect device including a two-piece body with a longitudinally movable collar surrounding a portion of each of the two pieces, the collar holding the two pieces together in a first position and separating the two pieces in a second or activated position. The apparatus including mounting apparatus fixedly attaching the quick disconnect device to a vehicle to be protected from physical shock or concussion, the collar including a mass, a spring having one end abutting the mass, and a spring stop formed as one of a portion of the mounting apparatus or a separate component, the spring stop engaged with an opposite end of the spring and holding the spring in a biasing position against the mass. The spring is designed to provide a bias on the mass that prevents movement of the mass and collar into the activated position during accelerations in a normal use range.

The desired objects and aspects of the instant invention are further realized in a method of constructing blast activated quick-disconnect apparatus including the step of providing a quick disconnect device having a two-piece body with a longitudinally movable collar surrounding a portion of each of the two pieces, the collar holding the two pieces together in a first position and separating the two pieces in a second or activated position. The method further includes the steps of fixedly attaching the quick disconnect device to a vehicle to be protected from physical shock or concussion, affixing a mass to the movable collar of the two-piece body, positioning a compression spring around a portion of the two-piece body with one end abutting the mass, and forming a spring stop as one of a portion of the mounting apparatus or a separate component and positioning the spring stop in engagement with an opposite end of the spring to hold the spring in a biasing position against the mass, and designing the spring to provide a bias on the mass that prevents movement of the mass and collar into the activated position during accelerations in a normal use range.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
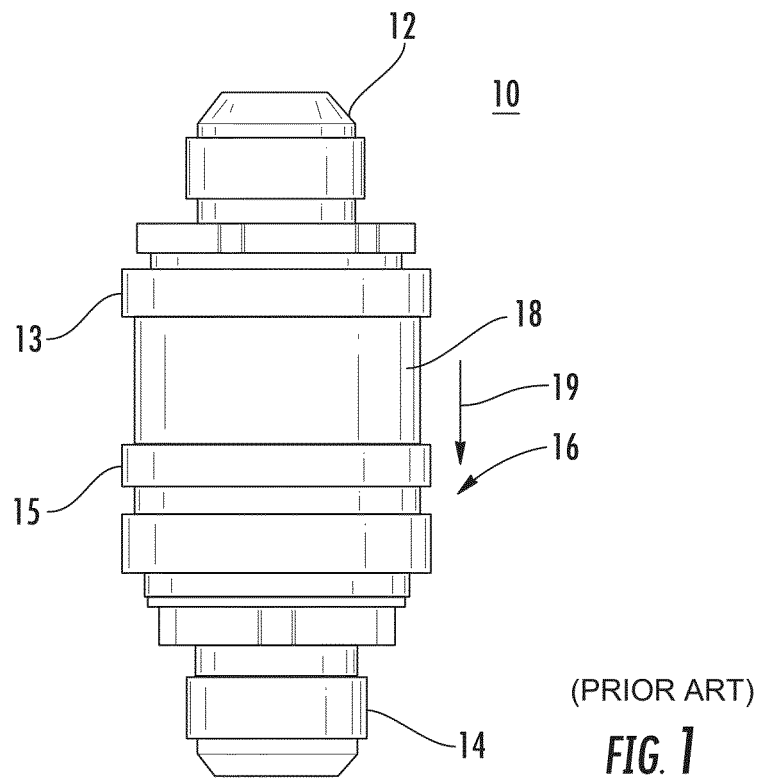
FIG. 1 is a side view illustrating a commercial, off-the-shelf fuel quick disconnect device.

As explained briefly above, quick-disconnect devices are available commercially generally for the purpose of enabling the manual quick-disconnect of fuel lines and the like for various purposes, such as maintenance, etc. These commercially available devices are hand operated and will not automatically disconnect a fuel line. One such device illustrated in FIG. 1 and designated 10 is an off-the-shelf fuel quick disconnect by Eaton/Aeroquip. Device 10 includes an inlet/outlet port 12 designed to receive one end of a fuel line fixedly attached thereto. A second outlet/inlet port 14 is designed to receive a second, mating end of the fuel line fixedly attached thereto. Ports 12 and 14 complete a fluid path through device 10. Ports 12 and 14 are part of a two piece body 16, positioned together in tight fuel-communicating cooperation and held in place by a longitudinally movable collar 18. When movable collar 18 is slid downwardly, as indicated by arrow 19, the two body parts are free to separate longitudinally and internal springs (not shown) quickly force the two pieces apart.

Figure 2:
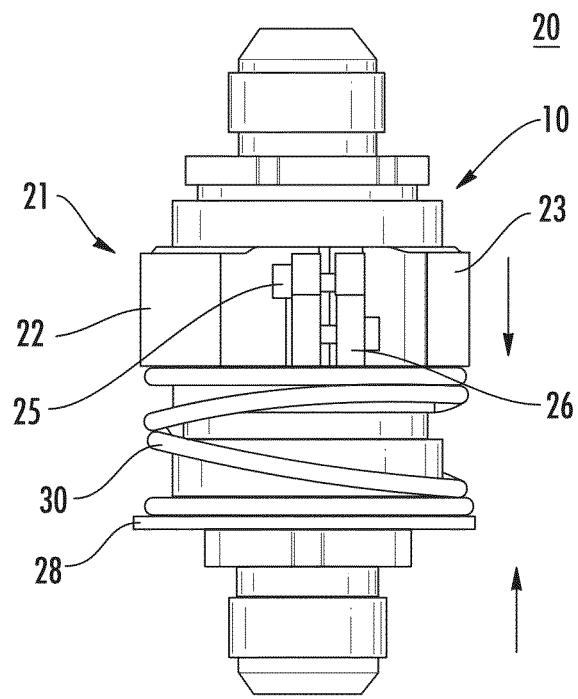
FIG. 2 is a side view of blast activated quick-disconnect apparatus in combination with the device of FIG. 1, in accordance with the present invention.

Turning now to FIG. 2, blast activated quick-disconnect apparatus 20 is illustrated in combination with the device of FIG. 1, in accordance with the present invention. As explained above, device 10 is constructed and sold as a manually operated quick-disconnect device. In accordance with the present invention, a mass 21 in the form of mating half-collar elements 22 and 23 is positioned to encircle movable collar 18 of device 10 and fixedly held in place by some connection element, such as screws 25 threadedly engaged in radially outwardly extending flanges 26 at the ends of each half-collar element 22 and 23. Mass 21, in this example being half-collar elements 22 and 23, can be formed of any material with sufficient weight to provide the necessary mass, such as lead, iron, steel, etc. Further, in this preferred embodiment, half-collar elements 22 and 23 are formed to fit between radially outwardly extending flanges 13 and 15 adjacent the upper and lower ends, respectively, of collar 18, so that any longitudinal movement of half-collar elements 22 and 23 produces a longitudinal force thereon and carries collar 18 along. It will be understood that mass 21 can be formed as separable elements affixed to collar 18 as shown, or as an integral element to collar 18. As an integral element, collar 18 would need to undergo a substantial increase in mass.

A washer-like spring stop 28 is affixed to the lower portion of body 16 so as to be spaced longitudinally below (in FIG. 2) collar 18. A compression spring 30 is positioned circumferentially around and encircling body 16 between spring stop 28 and the lower surface of half-collar elements 22 and 23. Spring 30 provides a bias on mass 21 that prevents activation at accelerations found in normal use range. Here it will be understood that "normal use range" can easily be determined by simply measuring accelerations that occur while driving a vehicle to be protected (or a similar vehicle) through several days of normal usage. However, once an acceleration of device 20 exceeds the normal use range, as for an example a physical shock or concussion accelerates device 20 upwardly in FIG. 2, mass 21 overcomes the bias of spring 30 and moves downwardly carrying collar 18 with it. The two pieces of body 16 are no longer fixed together and are separated by the internal springs. The size of mass 21 and the force of spring 30 can be adjusted, relative each other, to provide release at the ideal activation acceleration. In other words, for a particular mass selected, a spring force can be adjusted to allow movement of the mass only at a threshold acceleration. Less than threshold acceleration will not allow the mass to move due to the spring bias.

Adjustment of the spring bias can be made by replacing the spring, or by providing an adjustable bias such as a threaded spring assembly to adjust the spring bias. Conversely, with a particular spring bias selected, the mass can be adjusted to allow movement of the mass only at a threshold acceleration. Less than threshold acceleration will not allow the mass to move due to the mass being too small to overcome the spring bias.

Figure 3:
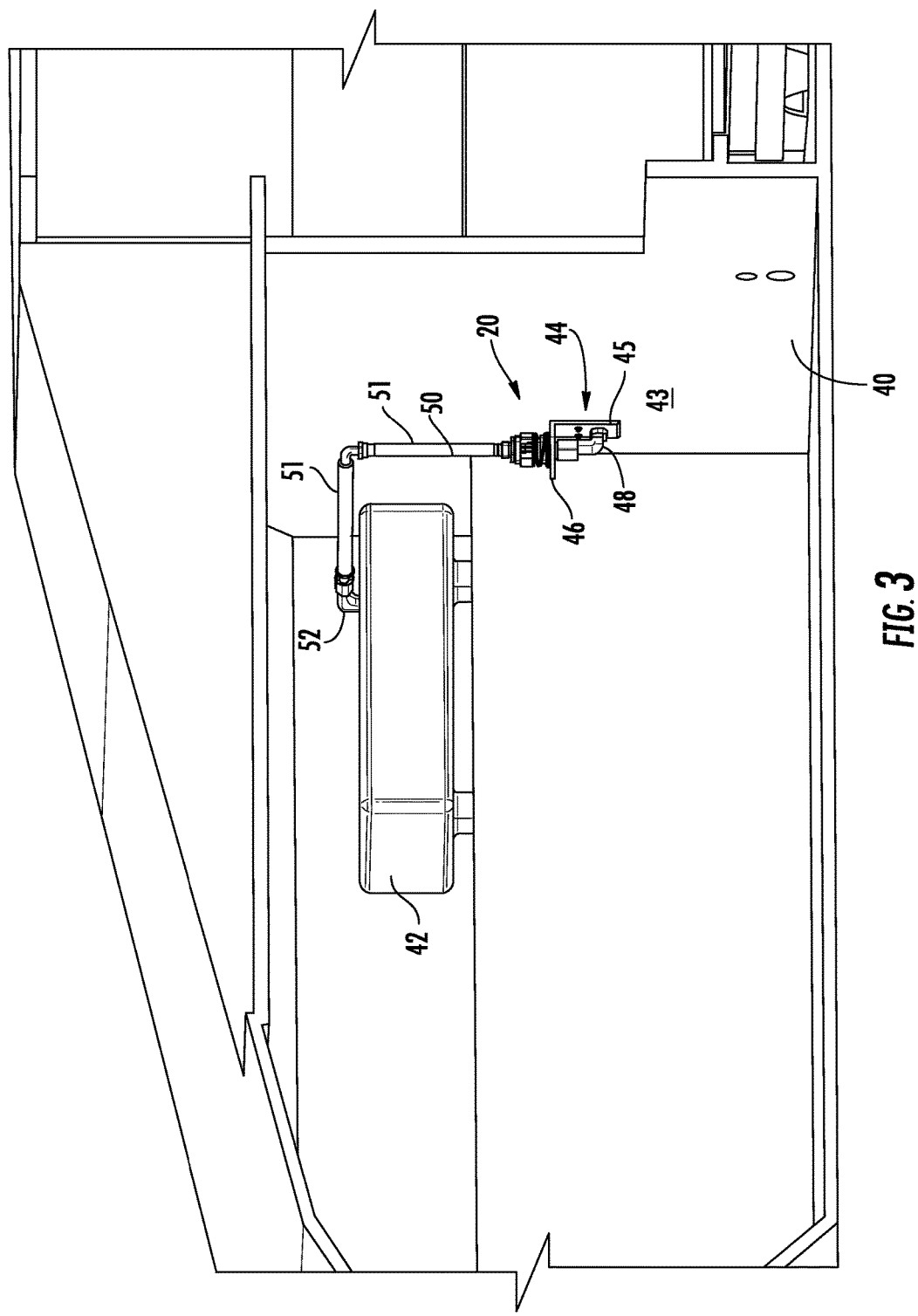
FIG. 3 is a side view in perspective of the blast activated quick-disconnect apparatus of FIG. 2 in a typical operating installation in accordance with the present invention.

Turning to FIG. 3, a typical operating installation is illustrated of blast activated quick-disconnect apparatus 20 in accordance with the present invention. A vehicle hull 40 is illustrated with a fuel tank 42 mounted therein. A blast activated quick-disconnect apparatus 20 is fixedly attached to hull 40 for activation in a desired direction by mounting apparatus 43 which in this specific example is a right angle bracket 44. It will be understood that mounting apparatus 43 could include other structures (e.g. pieces welded to hull 40 eyebolts threaded to hull 40, etc.) but bracket 44 is preferred for its simplicity, ruggedness, and adaptability. Right angle bracket 44 has a vertically extending arm 45 rigidly affixed to vehicle hull 40 and apparatus 20 is mounted through an opening in an outwardly directed arm 46. In this example, arm 46 of bracket 44 replaces and operates as spring stop 28 of FIG. 2. That is, outlet/inlet port 14 below arm 46 is connected through coupling 48 to a fuel line extending forward through hull 40 and spring 30 is positioned above arm 46. A fuel hose 50, including at least one flexible portion 51 is connected at one end to inlet/outlet port 12 of apparatus 20 and the other end is connected to a fuel outlet 52 in the top of fuel tank 42.

In this example, when a physical shock or concussion accelerates hull 40 upwardly, the greater than normal acceleration of hull 40 and apparatus 20 forces mass 21 against spring 30 causing mass 21 and collar 18 to move downwardly and disconnect the two pieces of body 16. The flexible portion 51 of fuel hose 50 is sufficiently flexible for the hose and upper portion of apparatus 20 to fall away and stop any further extraction of fuel from fuel tank 42.

Figure 4:
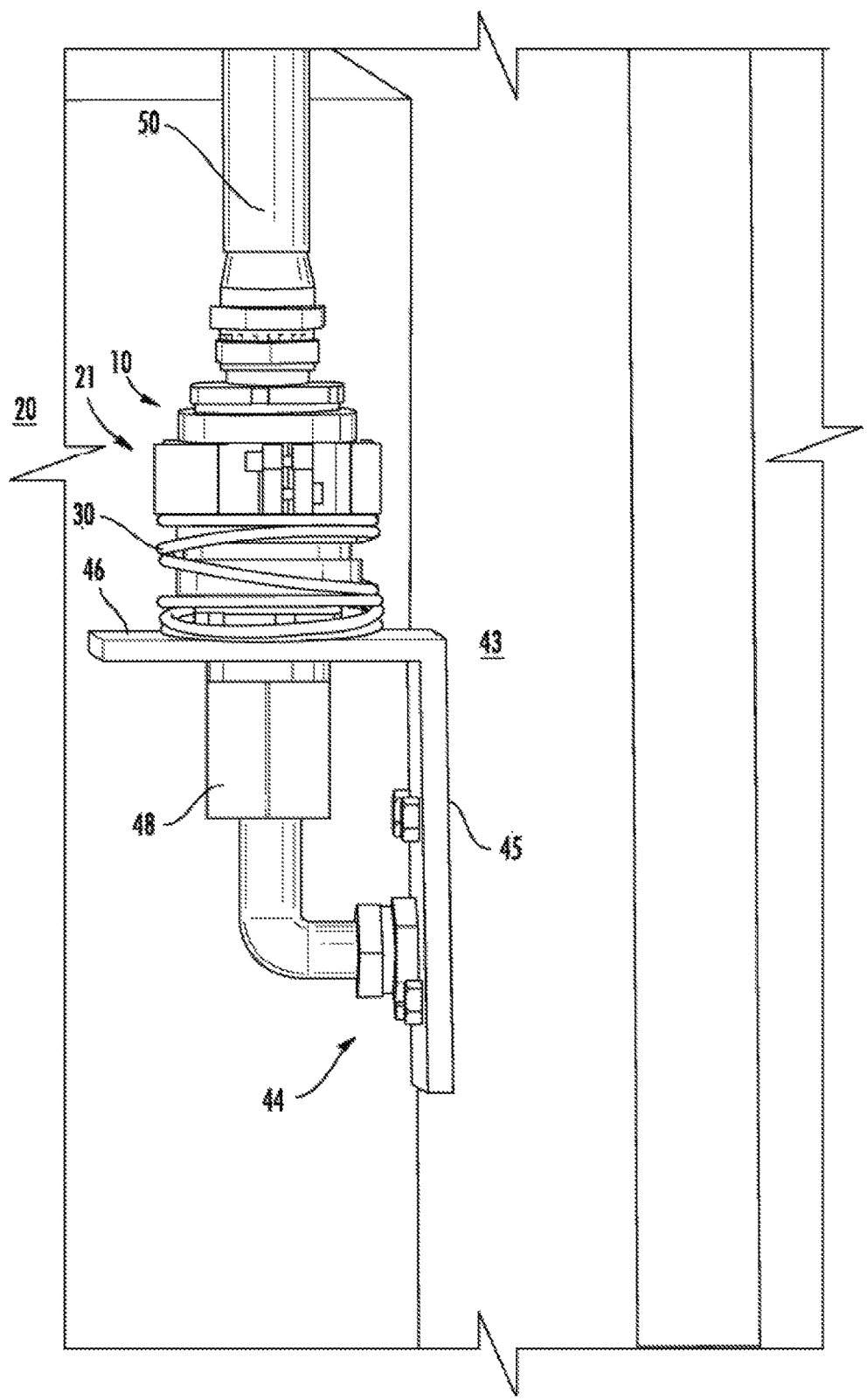
FIG. 4 is a side view in perspective of the blast activated quick-disconnect apparatus of FIG. 2 in a push mode operating installation in accordance with the present invention.

Turning to FIG. 4, an enlarged view is illustrated of the mounting of apparatus 20 in an operating installation similar to the installation illustrated in FIG. 3. As can be seen in more detail, arm 46 of right angle bracket 44 has an opening therethrough sufficiently large to allow coupling 48 to connect with outlet/inlet port 14 of device 10 while serving as a reaction member or spring stop for spring 30. Further, since bracket is rigidly attached to vehicle hull 40 all movement of hull 44 is transferred to apparatus 20. Thus, any excessive (in FIG. 3) acceleration (i.e. outside the normal use range) will be transferred to apparatus 20 and cause mass 21 to overcome the bias of spring 30 and automatically disconnect the fuel line.

Figure 5:
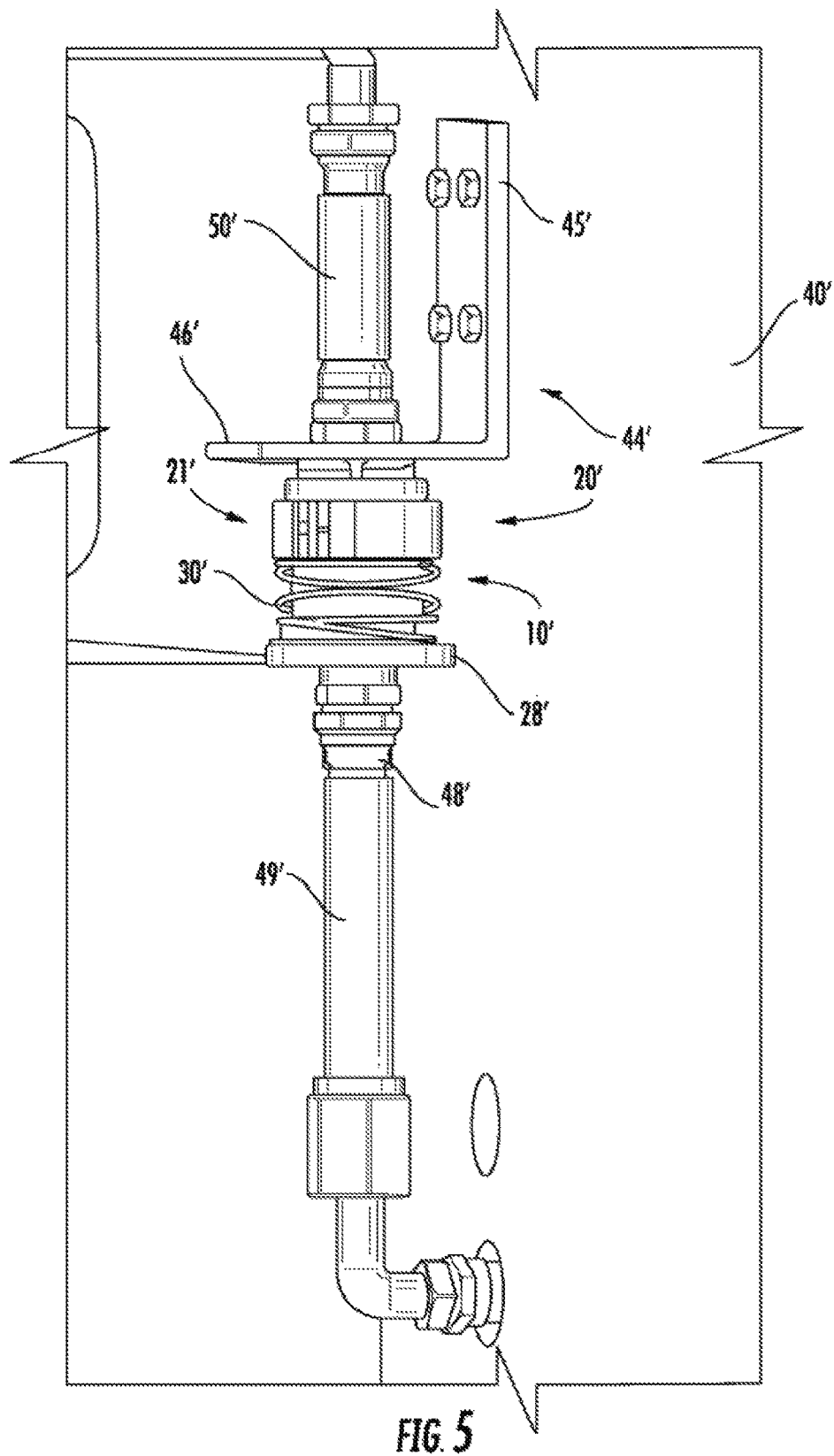
FIG. 5 is a side view in perspective of the blast activated quick-disconnect apparatus of FIG. 2 in a pull mode operating installation in accordance with the present invention.

Turning to FIG. 5 a different mounting arrangement for apparatus 20 is illustrated. In this example components similar to those in the example illustrated in FIG. 4 are designated with similar numbers and a prime (') is added to indicate the different example. An arm 46' of a right angle bracket 44' has an opening therethrough sufficiently large to allow coupling 50' to connect with outlet/inlet port 12' of device 10'. Further, arm 45' of bracket 44' is rigidly attached to vehicle hull 40' so that all movement of hull 44' is transferred to apparatus 20'. In this example, a washer-like spring stop 28' is affixed to the lower portion of body 16' so as to be spaced longitudinally below (in FIG. 2) collar 18'. A compression spring 30' is positioned circumferentially around and encircling body 16' between spring stop 28' and the lower surface of mass 21'. Spring 30' provides a bias on mass 21' that prevents activation at accelerations found in normal use range.

Thus, any excessive acceleration of hull 40' in FIG. 5 (i.e. outside the normal use range) will be transferred to apparatus and cause mass 21' to overcome the bias of spring 30' and automatically disconnect the fuel line. In this example coupling 48' to a fuel line extending through hull 40' includes a flexible portion 49' of fuel hose sufficiently flexible for the hose and lower portion of apparatus 20' to fall away and stop any further extraction of fuel from the fuel tank. Therefore, any excessive (i.e. outside the normal use range) acceleration in FIG. 5 will be transferred to apparatus 20' and cause mass 21' to overcome the bias of spring 30' and automatically disconnect the fuel line.

Thus, new and improved blast activated quick-disconnect apparatus has been disclosed. Also, the new and improved blast activated quick-disconnect apparatus is relatively inexpensive and easy to install and use. Further, once the problem has been overcome, assuming operability of the vehicle remains, the fuel line can be quickly reconnected without modification or additional tools. It should be understood that while two examples of protection against excessive acceleration in two different directions has been shown apparatus 20 can be mounted to compensate for excessive acceleration in virtually any direction or several can be mounted for protection in several directions simultaneously.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In cooperation with a quick disconnect device with a longitudinally movable collar surrounding, the collar provided in a first position and being moved in a second or activated position in response to a physical shock or concussion, the collar comprising a flange that extends outward from a surface of the collar and extends around the collar in a circumferential manner, an apparatus comprising:
   a mounting apparatus fixedly attaching the quick disconnect device to a vehicle to be protected from physical shock or concussion;
   a mass affixed to the movable collar, wherein the mass includes two semi-cylindrical portions affixed together and surrounding and engaging the flange of the collar of the quick disconnect device, each semi-cylindrical portion has a surface that contacts a surface of the flange in a circumferential manner;
   a coil spring having one end abutting the mass, the coil spring extending around the collar in a circumferential manner such that the coil spring encloses the collar; and
   a spring stop formed as one of a portion of the mounting apparatus or a separate component, the spring stop engaged with an opposite end of the coil spring and holding the coil spring in a biasing position against the mass, the coil spring being designed to provide a bias on the mass that prevents movement of the mass and collar into the activated position during accelerations in a normal use range.

2. Blast activated quick-disconnect apparatus as claimed in claim 1 wherein the coil spring is an elongated compression spring positioned between the mass and the spring stop.

3. Blast activated quick-disconnect apparatus as claimed in claim 1 wherein the spring stop is a separate component including a washer-like element.

4. Blast activated quick-disconnect apparatus as claimed in claim 1 wherein the mounting apparatus includes a right angle bracket with a first arm affixed to the vehicle to be protected and a second arm extending outwardly, the second arm forming the spring stop.

5. Blast activated quick-disconnect apparatus as claimed in claim 1 wherein the quick disconnect device further includes an input/output fuel port designed to have opposite ends of a fuel line attached thereto with at least one of the opposite ends of the fuel line including a portion of flexible fuel hose, whereby the fuel line is disconnected when the collar is moved into the activated position.

6. In cooperation with a quick disconnect device including a longitudinally movable collar having a circumferentially extending flange that extends outward from a surface of the collar adjacent each of opposite ends, the movable collar in a first position and is moved into a second or activated position in response to a physical shock or concussion, blast activated quick-disconnect apparatus comprising:
   mounting apparatus fixedly attaching the quick disconnect device to a vehicle to be protected from physical shock or concussion;
   a mass affixed to the movable collar, the mass including two semi-cylindrical portions affixed together and surrounding and engaging the flange of the collar of the quick disconnect device, each semi-cylindrical portion has a surface that contacts a surface of the flange in a circumferential manner, the two semi-cylindrical portions positioned between the circumferentially extending flanges and abutting both of the flanges on each end of the collar;
   a coil spring having one end abutting the mass, the coil spring extending around the collar in a circumferential manner such that the coil spring encloses the collar; and
   a spring stop formed as one of a portion of the mounting apparatus or a separate component, the spring stop engaged with an opposite end of the coil spring and holding the coil spring in a biasing position against the mass, the spring being designed to provide a bias on the mass that prevents movement of the mass and collar into the activated position during accelerations in a normal use range.

7. Blast activated quick-disconnect apparatus as claimed in claim 6 wherein the coil spring is an elongated compression spring positioned between the mass and the spring stop.

8. Blast activated quick-disconnect apparatus as claimed in claim 6 wherein the spring stop is a separate component including a washer-like element.

9. Blast activated quick-disconnect apparatus as claimed in claim 6 wherein the mounting apparatus includes a right angle bracket with a first arm affixed to the vehicle to be protected and a second arm extending outwardly, the second arm forming the spring stop.

10. Blast activated quick-disconnect apparatus as claimed in claim 6 wherein the quick disconnect device further includes an input/output fuel port designed to have opposite ends of a fuel line attached thereto with at least one of the opposite ends of the fuel line including a portion of flexible fuel hose, whereby the fuel line is disconnected when the collar is moved into the activated position.

11. A method of constructing blast activated quick-disconnect apparatus having a quick disconnect device including a longitudinally movable collar, the collar in a first position and being moved in a second or activated position in response to a physical shock or concussion, the collar comprising a flange that extends outward from a surface of the collar and extends around the collar in a circumferential manner, the method comprising the steps of:
   fixedly attaching the quick disconnect device to a vehicle to be protected from physical shock or concussion;
   affixing a mass to the movable collar, wherein the mass includes two semi-cylindrical portions affixed together and surrounding and engaging the flange of the collar of the quick disconnect device, each semi-cylindrical portion has a surface that contacts a surface of the flange in a circumferential manner;
   positioning a compression coil spring circumferentially around the collar with one end abutting the mass, the coil spring extending around the collar in a circumferential manner such that the coil spring encloses the collar; and
   forming a spring stop as one of a portion of the mounting apparatus or a separate component and positioning the spring stop in engagement with an opposite end of the coil spring to hold the coil spring in a biasing position against the mass, and designing the coil spring to provide a bias on the mass that prevents movement of the mass and collar into the activated position during accelerations in a normal use range.

12. The method as claimed in claim 11 wherein the step of designing the spring to provide bias on the mass that prevents movement of the mass and collar into the activated position during accelerations in a normal use range includes measuring accelerations that occur while driving a vehicle to be protected or a similar vehicle through several days of normal usage.

13. The method as claimed in claim 11 wherein the step of providing the quick disconnect device further includes providing an input/output fuel port designed to have opposite ends of a fuel line attached thereto and a further step of providing at least one of the opposite ends of the fuel line with a portion of flexible fuel hose so that the fuel line is disconnected when the collar is moved into the activated position.

* * * * *